United States Patent
Kurosaki

(10) Patent No.: US 6,864,382 B2
(45) Date of Patent: Mar. 8, 2005

(54) METHOD FOR CHEMICALLY RECYCLING ORGANIC GARBAGE, MATERIALS MADE OF THE ORGANIC GARBAGE AND A RECYCLING DEVICE USED THEREFOR

(75) Inventor: Hirofumi Kurosaki, Utsunomiya (JP)

(73) Assignee: Kabushiki Kaisha Techno Life Japan, Utsunomiya (JP)

(*) Notice: Subject to any disclaimer, the term of this patent is extended or adjusted under 35 U.S.C. 154(b) by 232 days.

(21) Appl. No.: 09/931,870

(22) Filed: Aug. 20, 2001

(65) Prior Publication Data

US 2003/0034408 A1 Feb. 20, 2003

(51) Int. Cl.$^7$ .............................................. C07C 51/00
(52) U.S. Cl. ........................... 554/156; 71/64.09; 71/14
(58) Field of Search ............................. 554/156; 71/14, 71/64.09; 106/713

Primary Examiner—Deborah D. Carr
(74) Attorney, Agent, or Firm—Wenderoth, Lind & Ponack, L.L.P.

(57) ABSTRACT

A method for chemically recycling organic garbage, materials made of the organic garbage and a recycling device used therefor, which comprises of mixing hydroxide (A) having a property of saponifying fats and oils into organic garbage to obtain a decreased gelled mixture (C) by vaporizing water through reaction heat, mixing a given additive (D) into the gelled mixture (C), and step of manufacturing materials (F).

9 Claims, 8 Drawing Sheets

FIG. 7
FIG. 8
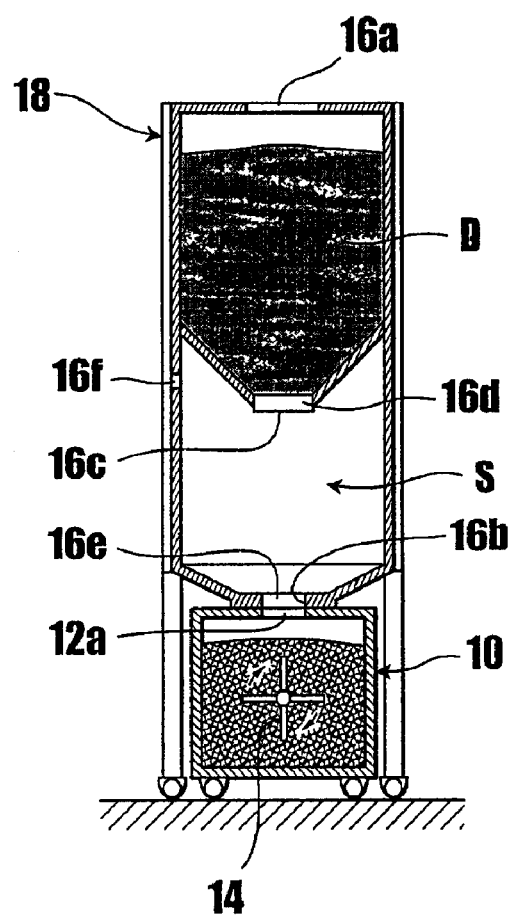
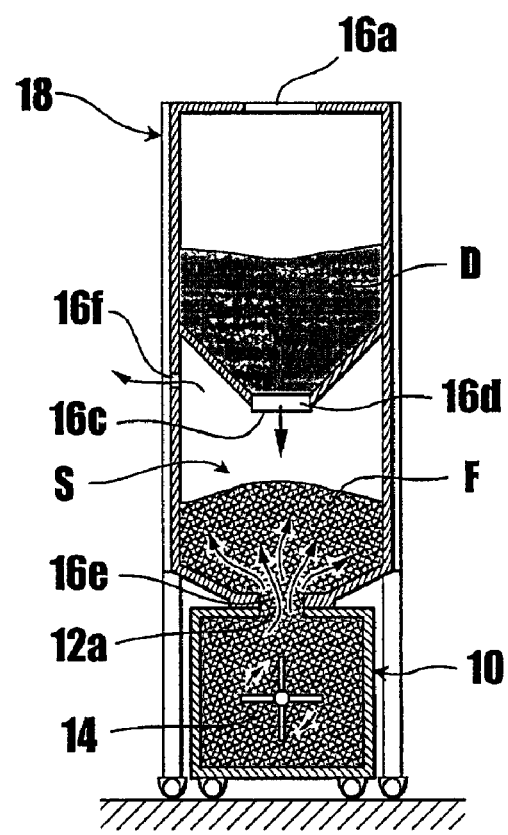

METHOD FOR CHEMICALLY RECYCLING ORGANIC GARBAGE, MATERIALS MADE OF THE ORGANIC GARBAGE AND A RECYCLING DEVICE USED THEREFOR

BACKGROUND OF THE INVENTION

1. Field of the Invention

This invention relates to a method for chemically recycling organic garbage, materials made of the organic garbage and a recycling device used therefor.

More particularly, this invention relates to a method for chemically recycling organic garbage such as kitchen garbage exhausted from kitchens of a school, a hotel or a restaurant, materials made of the kitchen garbage and a recycling device used therefor.

2. Description of the Prior Art

A large quantity of kitchen garbage is exhausted almost everyday from big kitchens installed in schools, hotels or restaurants.

In accordance with the conventional method of disposing the kitchen garbage, a cage is provided at an exhaust pipe of the kitchen for collecting the filtered solid garbage, which is subsequently burnt for disposal.

A big incinerator or burner is inevitably provided for burning the solid raw garbage so that its plant and equipment investment and running cost increase.

Accordingly, organic garbage such as kitchen garbage is disposed at sewage works, decomposed for decrease by the action of bacteria in septic tanks, cleaned and made safe so that it may be allowed to go back into a river, etc.

This conventional method, however, has some disadvantages that it takes a long time to decompose the kitchen garbage by the action of bacteria in septic tanks and its treating ratio is very low so that a large-sized facilities such as sewage works including septic tanks should have been installed.

The water discharged from the sewage works causes water pollution, and there is another annoying problem that an odor is emitted around the neighborhood.

SUMMARY AND OBJECTS OF THE INVENTION

A principal object of this invention is to provide a method for chemically recycling organic garbage which comprises a step of mixing hydroxide (A) having a property of saponifying fats and oils into organic garbage to obtain a decreased gelled mixture (C) by vaporizing water through reaction heat, a step of mixing a given additive (D) into the gelled mixture (C), and a step of manufacturing materials (F).

Another object of this invention is to provide a method for chemically recycling organic garbage, wherein organic garbage (B) is pre-crushed, pre-pulverized or pre-ground.

Another object of this invention is to provide a method for chemically recycling organic garbage, wherein either one of sodium hydroxide, potassium hydroxide or aluminum hydroxide is used for hydroxide (A).

Another object of this invention is to provide a method for chemically recycling organic garbage, wherein a neutralizing additive (D) is added into a gelled mixture (C), mixed, stirred and heated to remove water to produce pellet fertilizer (F).

Another object of this invention is to produce gelled or pellet fertilizer by a method for chemically recycling organic garbage (B).

Another object of this invention is to provide a method for chemically producing powdered materials, which is characterized in that substantially the same amount of calcium oxide (E) is mixed into a gelled mixture (C), while being stirred, to remove and vaporize water by hydration heat of calcium oxide (E).

Another object of this invention is to produce pellet concrete reinforcing material or soil improver made by a method for chemically recycling organic garbage (B).

Another object of this invention is to provide a recycling device for chemically recycling organic garbage (B) which comprises a strong anti-alkaline metallic container having a plurality of casters at the bottom thereof, an open-and-shut cover having an opening which is sidably mounted at one side top portion of the container, a stirrer rotationally mounted in the container, a driving unit for driving a motor of the stirrer which is located under an additive supplier, which is characterized in that the metallic container containing solid hydroxide having a property of saponifying fats and oils is moored alongside the driving unit to connect the stirrer to the driving unit, thus enabling to drop organic garbage (B) desirably into the container, to stir and mix the organic garbage (B) and the hydroxide (A) and to obtain a decreased gelled mixture (C) by vaporizing water through hydrating heat.

Still another object of this invention is to provides a method for chemically recycling organic garbage which comprises a recycling device including a strong anti-alkaline metallic container having a plurality of casters at the bottom thereof, an open-and-shut cover having an opening which is slidably secured at one side top portion of the container, a stirrer rotationally mounted in the container, a driving unit for driving a motor of the stirrer which is located under an additive supplier, which is characterized in that the metallic container containing solid hydroxide (A) having a property of saponifying fats and oils is moored alongside the driving unit to connect the stirrer to the driving unit, thus enabling to drop organic garbage (B) desirably into the container, to stir and mix the organic garbage (B) and the hydroxide (A) to obtain a decreased gelled mixture (C) by vaporizing water through hydrating heat, a legged additive tank located at a garbage disposal facility ground to step over the container containing the gelled mixture (C), the legged additive tank having a dumper being located above an additive dropping opening so that the gelled mixture (C), is dropped through the additive dropping opening into the additive (D) to produce pellet materials (F).

These and other advantages of the invention will become more apparent from the following detailed description thereof when taken in conjunction with the accompanying drawings.

BRIEF DESCRIPTION OF THE DRAWINGS

FIG. 7 is a vertical section showing that a legged additive supplier is connected to a garbage container;

FIG. 8 is a vertical section showing that kitchen garbage is being mixed with an additive in an additive mixing tank.

DETAILED DESCRIPTION OF THE PREFERRED EMBODIMENT

Figure 4:
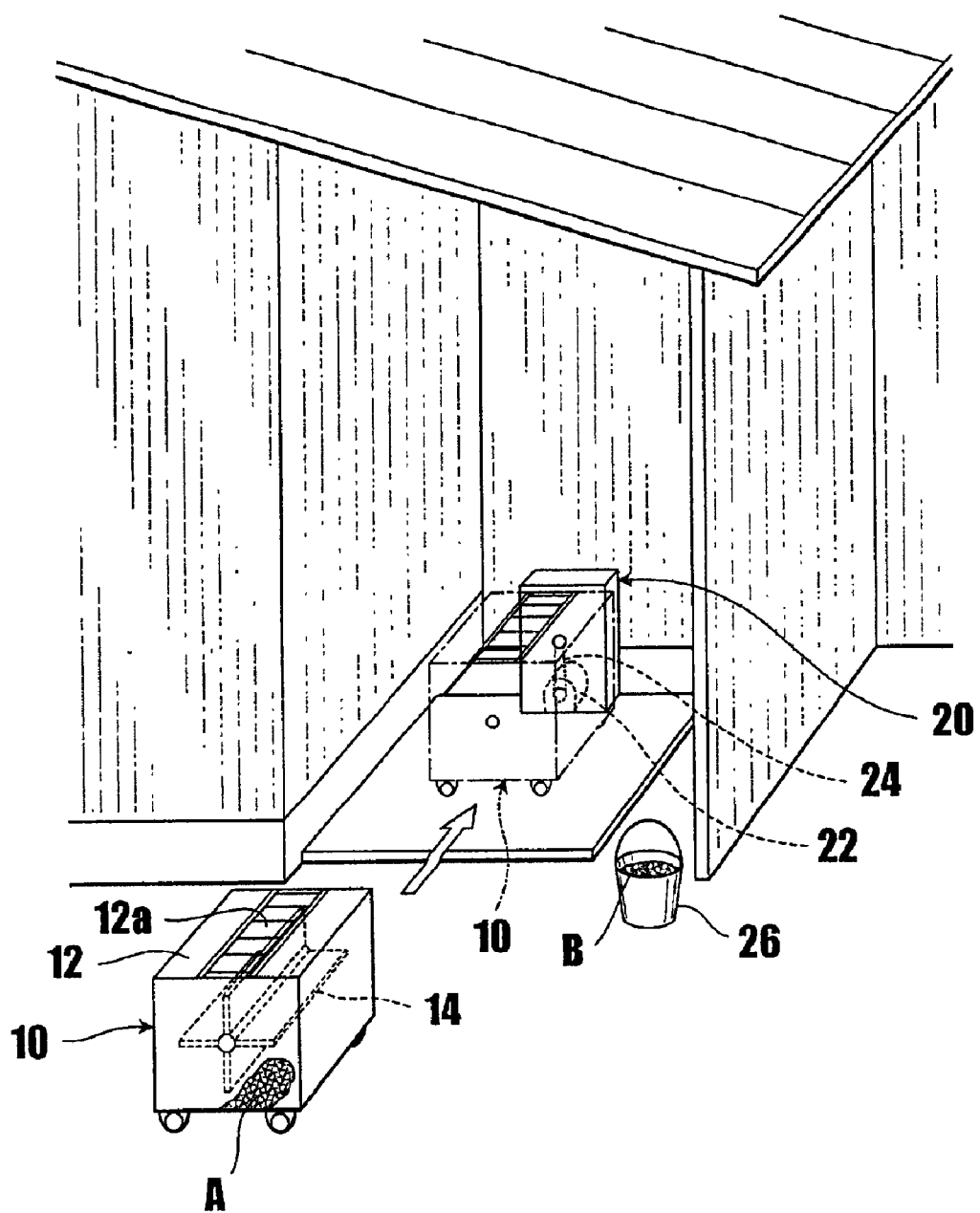
FIG. 4 is a perspective view showing a recycling device installed in a kitchen.
Figure 5:
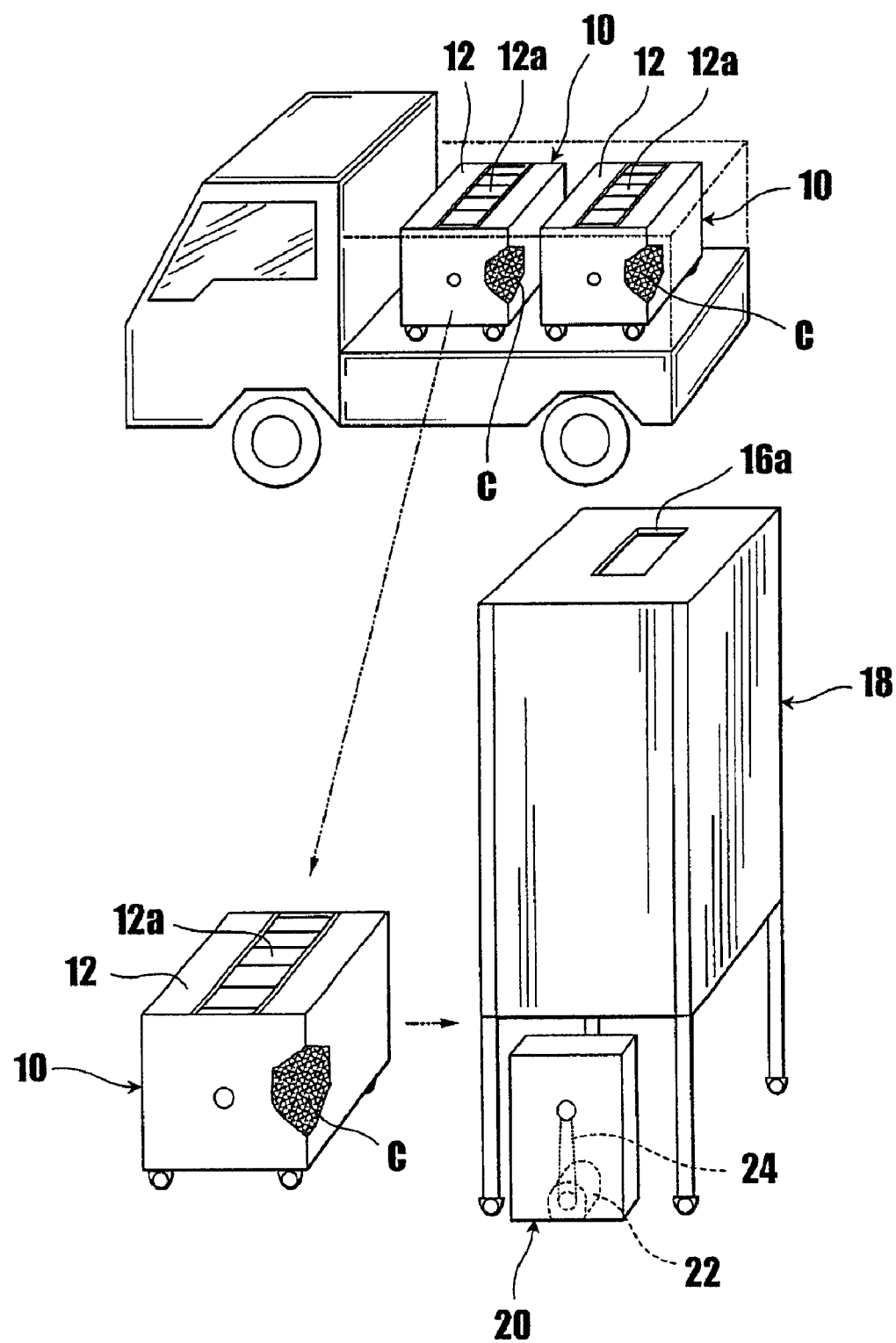
FIG. 5 is a perspective view showing that a pair of garbage containers is transported, one of which is being located under a legged additive supplier.
Figure 6A:
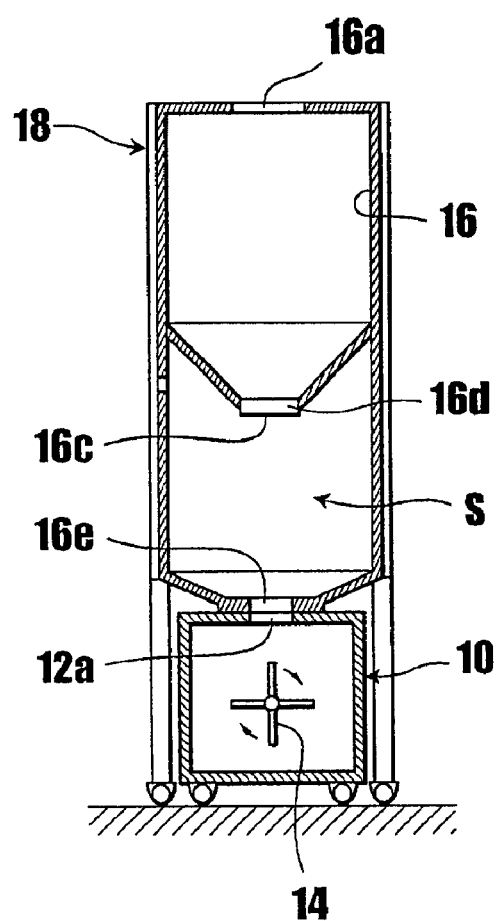
FIG. 6(a) is a vertical section of a legged additive supplier.
Figure 6B:
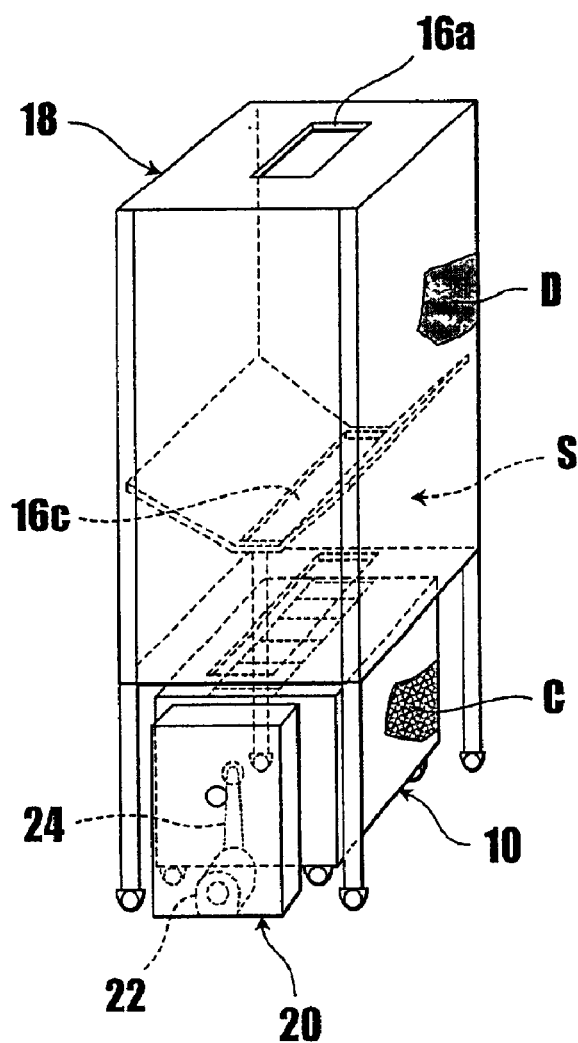
FIG. 6(b) is a perspective view of a legged additive supplier.

Referring to the accompanying drawings in which like numerals designate the like parts throughout the several views thereof, there is shown in FIGS. 4 and 5 a method for chemically recycling organic garbage.

A strong anti-alkaline metallic container 10 is provided with a plurality of casters at the bottom thereof, an open-and-shut cover 12 having a garbage dropping opening 12a for kitchen garbage (B) is slidably mounted at one side top portion of the container 10, and a stirrer 14 is rotationally mounted in the container 10.

Provided in the container 10 is a driving unit 20 for driving a motor 22 of the stirrer 14, and a drive chain 24 is provided in the driving unit 20 to drive the stirrer 14 rotationally.

As particularly shown in FIG. 4, the driving unit 20 is located at an exhaust facility for kitchen garbage (B) in a house, and the container 10 containing a solid hydroxide (A) having a property of saponifying fats and oils can be moored alongside the driving unit 20 in order to connect the container 10 to the driving unit 20.

Accordingly, the kitchen garbage (B) can be supplied by a bucket 26 desirably into the container 10 through the garbage dropping opening 12a of the cover 12, and the kitchen garbage (B) and the hydroxide (A) are mixed and stirred by vaporizing water through hydrating heat into a decreased gel mixture (C).

As shown in FIGS. 5–9, a legged additive tank 18 comprises an opening 16a on a top plate, a closing plate 16b, a drop opening 16c and a dumper 16d in the middle portion of the additive tank 18, and an additive dropping opening 16e at a bottom portion of the additive tank 18, which is located to step over the container 10 so that it can be connected to the driving unit 20, thus enabling to drop the gelled mixture (C) through the additive dropping opening 16e into the additive (D) to produce pellet materials (F).

It should be noted that an exhaust opening 16f is provided through a wall of the additive tank 18, and a space S is formed between the dumper 16d and the bottom plate of the dumper 16d to locate the exhaust opening 16f.

As in the foregoing example, the additive tank 18 is located to step over the container 12 so that it can be connected to the driving unit 20, thus enabling to drop the gelled mixture (C) through the additive dropping opening 16a into the additive (D) to produce pellet materials (F).

The garbage dropping opening 12a of the container 10 which contains a gelled mixture (C) is linked to the additive dropping opening 16e, and the additive (D) in the additive tank 18 is dropped through the adjusting dumper 16d into the container 10 to mix the gelled mixture (C) into the additive (D), which is subsequently stirred to produce pellet materials (F).

It is known that ester is hydrolyzed by alkali into alcoholic acid and alkaline salt (For example, RCOOR'+ NaOH→RCOONa+R'OH).

This reaction can be accelerated by ion hydroxide. It is also known that fats and oils (contained in animals and plants) are saponified into a gel which causes a high temperature around 120° C.

It is known that when calcium oxide is brought into water, it generates a high temperature around 70° C.

This invention is based on a chemical property that organic garbage containing fats and oils are mixed into alkaline material to produce a gelled mixture, which is recycled into various materials.

Figure 1:
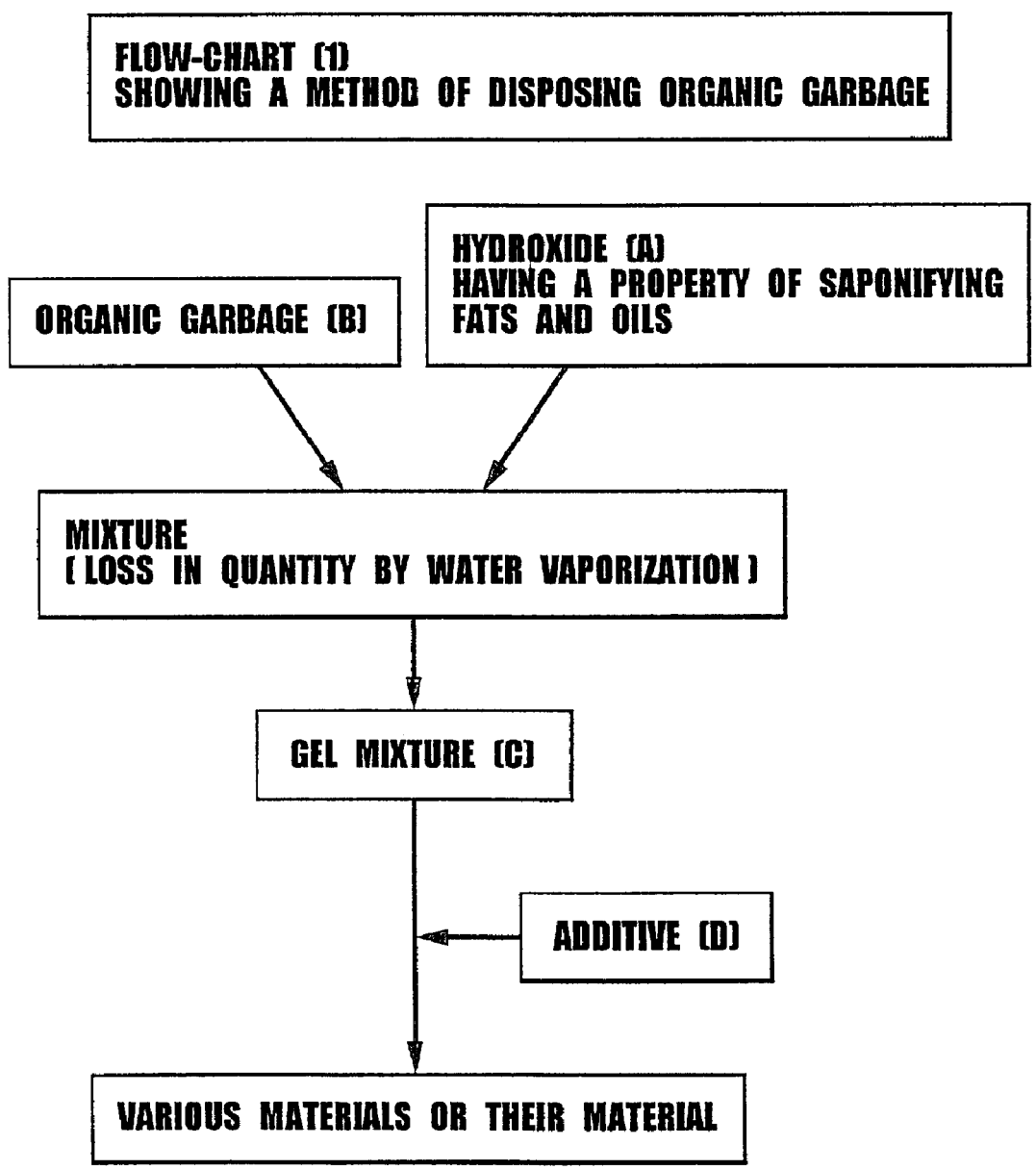
FIG. 1 is a flow-chart showing a first method of disposing organic garbage.

An example of chemical recycling of this invention will be explained with the drawing of FIG. 1.

Kitchen garbage (B) in a bucket or a drum can 12 is mixed into a solid hydroxide (A) having a property of saponifying fats and oils in the container 10, which are reacted with each other and stirred to vaporize water through hydrating heat into a decreased brown gelled mixture (C).

A desired additive (D) is mixed into the brown-gelled mixture (C) to produce various materials or other materials for recycling.

Either one of sodium hydroxide, potassium hydroxide or aluminum hydroxide is used for the solid hydroxide (A), among which sodium hydroxide is inexpensive and its heating value is large so that it can gelatinize the mixture (C) very quickly.

Among kitchen garbage, a vegetable has a moisture ratio of about 95% so that it is possible to decrease the quantity of the kitchen garbage to $1/10 \sim 1/20$ of the starting kitchen garbage when the moisture is heated at a temperature above 100° C.

Figure 2:
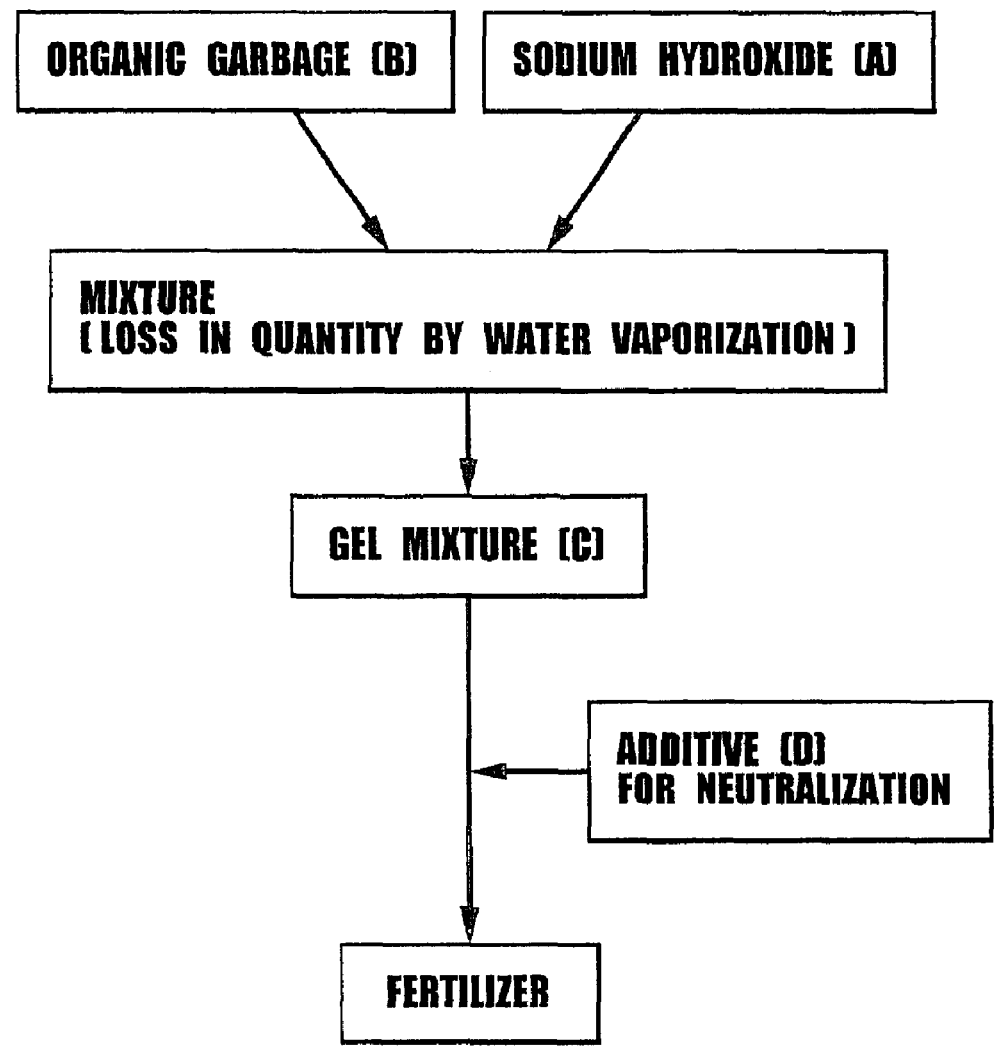
FIG. 2 is a flow-chart showing a second method of disposing organic garbage.

As shown in FIG. 2, the gelled mixture (C) is strong alkali so that it is not suitable for a fertilizer, thus requiring addition of a neutralizing additive (D).

The gelled mixture fertilizer (C) thus produced can be filled in a vinyl bag, or if necessary, it is stirred and mixed to remove water to produce pellet fertilizer, which can be filled in a bag.

Figure 3:
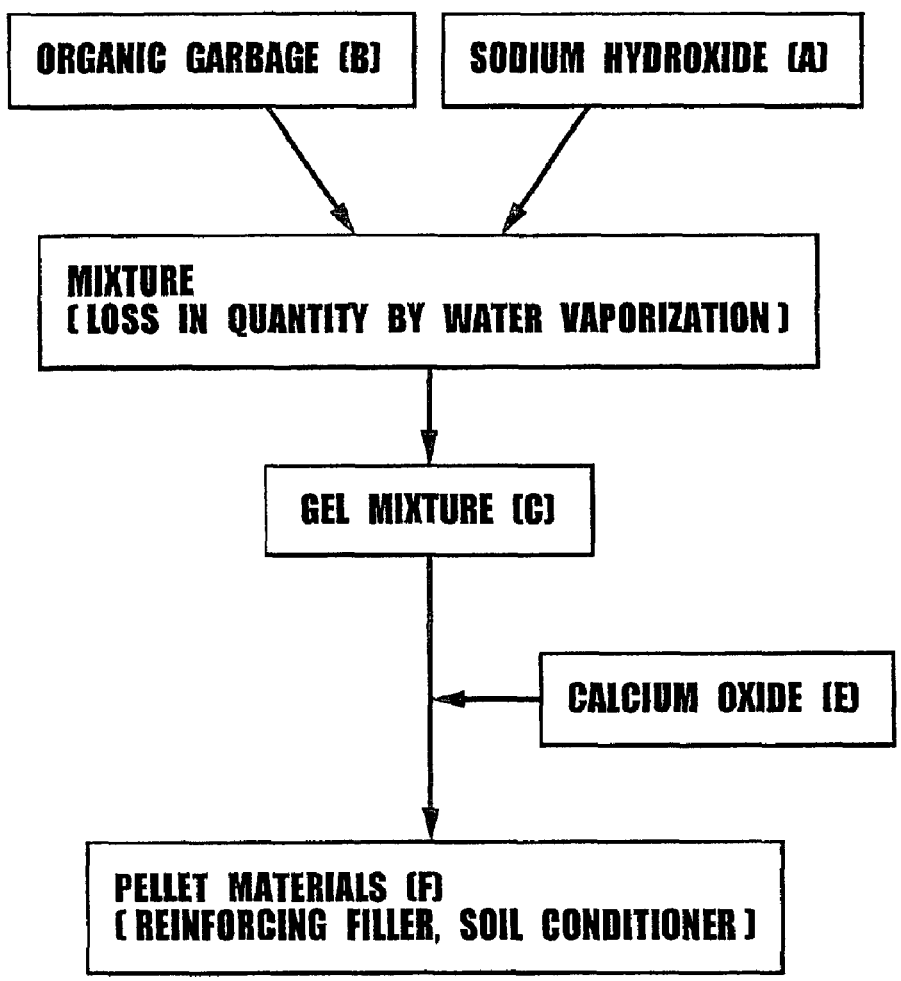
FIG. 3 is a flow-chart showing a third method of disposing organic garbage.

As shown in FIG. 3, calcium oxide (E) is used for an additive (D), substantially the same amount of which is mixed into the gelled mixture (C) for removing water by vaporization through hydrating heat in order to produce pellet materials such as concrete reinforcing agent or soil improver.

To carry out the foregoing example, a kitchen garbage recycling system is required.

As shown in FIG. 4, a strong anti-alkaline metallic container 10 having a plurality of casters at the bottom thereof is slidably provided with an open-and-shut cover 12 at one side top portion of the container 10, a garbage dropping opening 12a for dropping the kitchen garbage (B) is provided on the open-and-shut cover 12, a stirrer 14 is rotationally mounted in the container 10, a driving unit 20 for driving a motor 22 is located in an exhaust facility in a house, and a drive chain 24 is provided to link the stirrer 14 to the motor 22.

As explained in the foregoing paragraph and shown in FIG. 4, the container 10 containing a solid hydroxide (A) having a property of specifying fats and oils can be moored alongside the driving unit 20 to connect the container 10 to the driving unit 20.

The kitchen garbage (B) can be supplied by a bucket 26 on occasion into the container 10 through the opening 12a of the cover 12.

Alternatively, the kitchen garbage (B) can be supplied automatically.

The kitchen garbage (B) and the hydroxide (A) are mixed and stirred to vaporize water through hydrating heat to obtain a decreased gel mixture (C).

The container 10 containing the decreased gelled mixture (C) thus obtained can be transported by a truck into a garbage disposal facility as shown in FIG. 5.

In FIG. 7, the legged additive tank 18 is located to step over the container 10, the garbage dropping opening 12a of the container 10 is linked to the additive dropping opening 16e, and the additive (D) such as calcium oxide (E) in the additive tank 18 is dropped through the adjusting dumper 16d and the garbage dropping opening 12a to mix into the gelled mixture (C), which are fully mixed by the stirrer 14 for long hours to obtain white pellet materials (F).

As shown in FIG. 8, the white pellet materials (F) are added into the gelled mixture (C), thus filling to overflow into the space S.

When the gelled mixture (C) and calcium oxide (E) are mixed for about 20~30 minutes, the temperature in the space S rises by a hydrating action, and moisture in the space S is discharged in the air through the exhaust opening 16f.

When the mixing of the pellet materials (F) has been finished, the dropping opening 16e is closed by the closing plate 16b, and the container 10 is disengaged from the legged additive tank 18.

Figure 9:
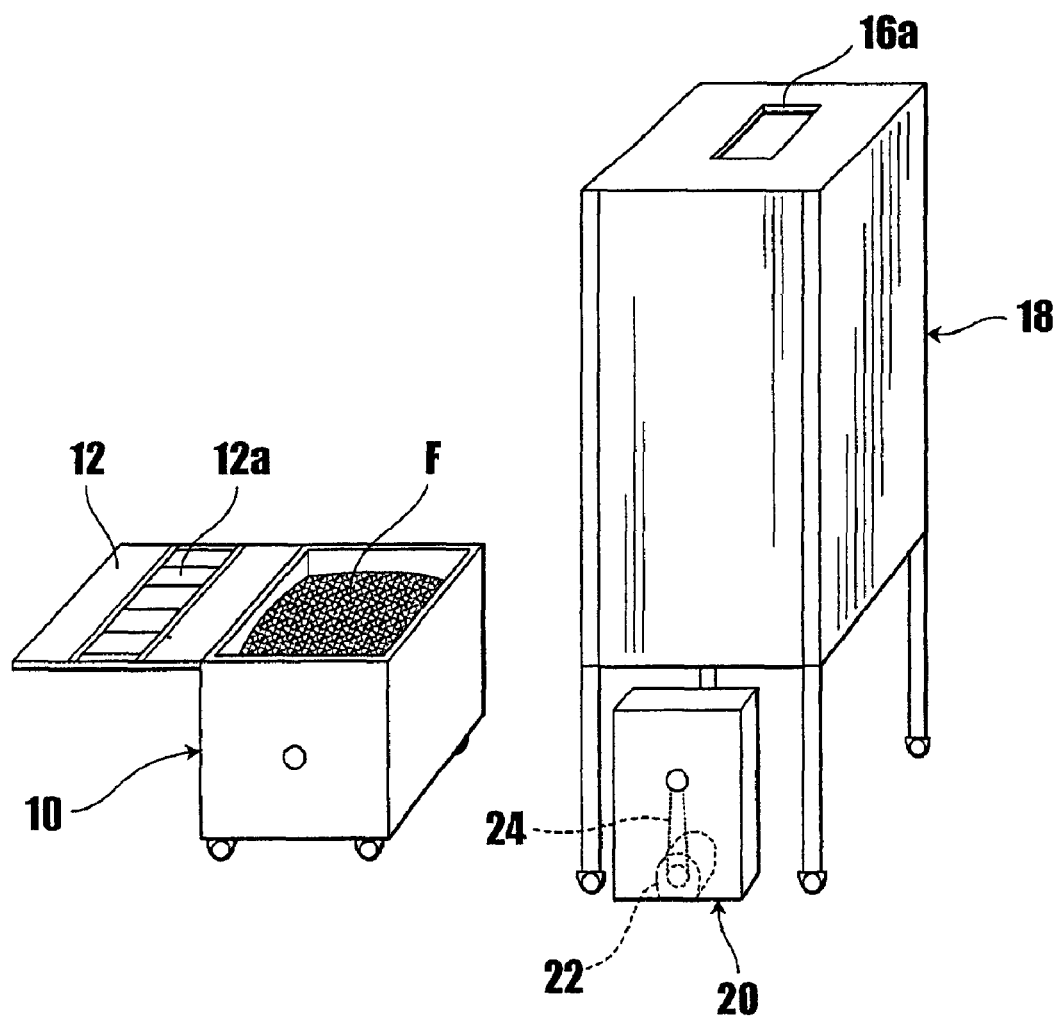
FIG. 9 is a perspective view showing that a metallic garbage container is disengaged from an additive mixing tank.

In FIG. 9, the open-and-shut cover 12 of the container 10 is opened, and the pellet materials (F) are filled in a plurality of the given bags for delivery.

The closing plate 16b is opened to exhaust the remaining pellet materials (F) in the space S, they are filled in a plurality of the given bags for delivery to be used for concrete reinforcing agent and soil improver.

In another example, when a container 10 having a capacity of 1 ton is used, about 15 Kg. of flaked solid sodium hydroxide is mixed, and it is possible to enter a total amount of about 10 ton of kitchen garbage (B) once or little by little into the container 10.

The entered kitchen garbage (B) can be mixed and gelatinized continuously.

When the mixing has been carried out for about 5~9 hours, water is vaporized and removed by hydrating heat, and the gelled mixture (C) which contains about 1 ton of the decreased brown gelled mixture and non-gelled mixture (C) remains in the container 10.

When the container 10 is fully filled with the gelled mixture (C), it is disengaged from the driving unit 20, substituting with another container 20 containing about 15 Kg. of flaked solid sodium hydroxide.

The container 10 that is fully filled with the gelled mixture (C) is transported into a next disposal facility.

The gelled mixture (C) has a strong alkaline property so that putrefactive bacteria cannot multiply, does not cause decomposition or an odor.

In addition, the gelled mixture (C) in which only the additive (D) is added can be recycled into construction, engineering work materials, fertilizer or various other materials.

As described in the foregoing paragraphs, a device for recycling this system is very simple in construction in comparison to the conventional biological large-sized disposal systems.

All of the kitchen garbage (B) can be recycled so that air pollution caused by burning the same and water corruption are substantially avoided.

It should be recognized that a total amount of the organic garbage (B) can be recycled into effective fertilizer, soil improver, construction and engineering work materials or various other materials.

Other modifications can be made to this invention by those skilled in the art without departing from the scope thereof. While several forms of the invention have been illustrated and described, it will also be apparent that various modifications can be made without departing from the spirit and scope of the invention. Accordingly, it is not intended that the invention be limited, except as by the appended claims.

What I claim:

1. A method for chemically recycling organic garbage which comprises:

mixing hydroxide (A) having a property of saponifying fats and oils into organic garbage (B) to obtain a decreased gelled mixture (C) by vaporizing water through hydrating heat;

mixing a given additive (D) into said gelled mixture (C); and manufacturing materials from the chemically treated garbage.

2. A method for chemically recycling organic garbage as claimed in claim 1, wherein said organic garbage (B) is pre-crushed, pre-pulverized or pre-ground.

3. A method for chemically recycling organic garbage as claimed in claim 1, wherein either of sodium hydroxide, potassium hydroxide or aluminium hydroxide is used for hydroxide (A).

4. A method for chemically recycling organic garbage as claimed in claim 1 or 2, wherein a neutralizing additive (D) is added and mixed into the gelled mixture (C), stirred and heated to remove and vaporize water in order to produce gel or pellet fertilizer.

5. A gel or pellet fertilizer manufactured by the method as claimed in claim 3.

6. A method for chemically recycling organic garbage as claimed in claim 1 or 2, wherein said additive (D) is calcium oxide (E) and substantially the same amount of calcium oxide (E) is mixed, while being stirred, into said gelled mixture (C) to remove water by hydrating heat of said calcium oxide (E) to produce pellet materials (F).

7. Concrete reinforcing material or soil fertilizer produced by a method as claimed in claim 6.

8. A device for chemically recycling organic garbage which comprises a strong anti-alkaline metallic container having a plurality of casters at the bottom thereof, an open-and-shut cover having an opening which is slidably mounted at one side top portion of said container, a stirrer rotationally mounted in said container, a driving unit for driving a motor of said stirrer, which is characterized in that said metallic container containing solid hydroxide having a property of saponifying fats and oils is moored alongside said driving unit to connect said stirrer to said driving unit, thus enabling to drop organic garbage (B) and said hydroxide (A) and to obtain a decreased gelled mixture (C) by vaporizing water through hydrating heat of calcium oxide (E).

9. A method for chemically recycling organic garbage which comprises a strong anti-alkaline metallic container having a plurality of casters at the bottom thereof, an open-and-shut cover having an opening which is slidably mounted at one side top portion of said container, a stirrer rotationally mounted in said container, a driving unit for driving a motor of said stirrer, which is characterized in that said metallic container containing solid hydroxide having a property of saponifying fats and oils is moored alongside said driving unit to connect said stirrer to said driving unit, thus enabling to drop organic garbage (B) and said hydroxide (A) and to obtain a decreased gelled mixture (C) by vaporizing water through hydrating heat of calcium oxide (E).

* * * * *